United States Patent [19]
Seki et al.

[11] Patent Number: 6,144,806
[45] Date of Patent: Nov. 7, 2000

[54] CAMERA HAVING DATA PROTECTION MEANS

[75] Inventors: Yoichi Seki; Hiroyuki Saito; Teruyo Hayakawa, all of Yotsukaido, Japan

[73] Assignee: Seiko Precision Inc., Japan

[21] Appl. No.: 08/135,173

[22] Filed: Oct. 12, 1993

[30] Foreign Application Priority Data

Oct. 9, 1992 [JP] Japan .................................. 4-271825

[51] Int. Cl.$^7$ .................................................. G03B 7/24
[52] U.S. Cl. ........................... 396/208; 396/211; 396/321
[58] Field of Search ................. 354/484, 289.1, 354/21, 217, 288; 396/207, 208, 211, 321

[56] References Cited

U.S. PATENT DOCUMENTS

| | | | |
|---|---|---|---|
| 4,311,377 | 1/1982 | Matteson | 354/217 |
| 4,687,307 | 8/1987 | Ohsawa | 354/21 |
| 4,712,898 | 12/1987 | Haraguchi | 354/288 |
| 4,733,265 | 3/1988 | Haraguchi et al. | 354/484 |
| 4,783,674 | 11/1988 | Ishikawa et al. | 354/289.1 |
| 4,812,862 | 3/1989 | Fujino et al. | 354/21 |
| 4,916,474 | 4/1990 | Miyazawa | 354/484 |
| 4,978,982 | 12/1990 | Ishikawa et al. | 354/21 |
| 5,053,804 | 10/1991 | Odaka et al. | 354/484 |

FOREIGN PATENT DOCUMENTS 2147712  5/1985  United Kingdom.

*Primary Examiner*—Russell Adams
*Attorney, Agent, or Firm*—Adams & Wilks

[57] ABSTRACT

A camera has a back cover movable between a closed state and an open state to enable a film case to be installed in and removed from the camera. A detector detects the transition of the cover between the closed state and the open state. A data register stores control data, and a control circuit receives the control data from the data register for controlling operation of the camera. The control data is transferred temporarily from the data register to an EEPROM when the back cover makes the transition from the closed state to the open state. The control data is then transferred back from the EEPROM to the data register when the back cover makes the transition from the open state to the closed state. By temporarily storing the control data in an EEPROM when the back cover is open, and transferring the control data from the EEPROM back to the data register when the back cover is closed, the adverse effects of static electricity, external noise or resetting of the control circuit are prevented from disrupting the operation of the camera.

18 Claims, 5 Drawing Sheets

CAMERA HAVING DATA PROTECTION MEANS

BACKGROUND OF THE INVENTION

The present invention pertains to a camera having a temporary storing circuit for temporarily storing control data during loading and unloading of a film case to protect the control data from the effects of static electricity, power disruption or external noise.

In order to automatically adjust the operation of a camera depending on the particular film installed, the film case is provided with a conductive pattern which indicates the film sensitivity. The camera automatically reads the film sensitivity from the installed film case and sets suitable exposure conditions in accordance with the read sensitivity. The film case is installed by opening a back cover of the camera and placing the film case in the camera at a predetermined position. Once installed, the conductive pattern on the surface of the film case comes into electrical contact with a plurality of sensitivity detection terminals (DX terminals) provided in the camera. The film sensitivity is determined based on which ones of the DX terminals contact the conductive pattern, wherein different conductive patterns on the film case indicate different film sensitivities.

The conductive pattern can be formed by painting a conductive paint onto the surface of an insulated portion of the film case. Individual terminals of the plurality of DX terminals that contact the conductive paint pattern conduct electric current whereas the DX terminals which do not contact the conductive paint pattern do not conduct electric current. Alternatively, the pattern can be painted using an insulating paint formed on a conductive surface of the case. DX terminals which do not come in contact with the pattern of insulating paint will conduct electric current whereas DX terminals that do come into contact with the insulating paint will not conduct electric current. In this way, the film sensitivity can be determined by detecting the particular pattern of conductivity of the DX terminals and the operation of the camera can be set according to the film sensitivity.

A drawback of the conventional camera is that while the back cover is open and the film is being installed, static electricity accumulated on the body of the user may be input to the DX terminals, either directly by touching the terminals or through a conductive portion of the camera case. This static electricity causes a large voltage to be applied to a control circuit of the camera, which may result in damage or malfunction. Even if resistors of high resistance are connected to the DX terminals, there is the possibility that the high voltage will destroy the control circuit or cause a malfunction. Moreover, if the control circuit includes a reset circuit, then a voltage detector within the reset circuit will detect that the high voltage is in excess of a predetermined voltage, and the reset circuit will operate to erase the various settings (the contents of the control circuit memory) and the control circuit will be initialized.

As a result, the static electricity received by the DX terminals can disrupt the settings of the control circuit, such as the photographing mode (normal photographing, backlight photographing, continuous photographing, multiple exposure, self-timer, etc.) and the strobe mode (automatic flash, manual flash, red-eye reduction, etc.), causing the camera to operate improperly.

Furthermore, if a general purpose microcomputer is used as a CPU for the camera, the high voltage static electricity may disrupt a setting which determines whether a particular terminal is an input terminal or an output terminal, thus making photography impossible.

SUMMARY OF THE INVENTION

The present invention is intended to alleviate the drawbacks of the conventional art.

It is an object of the present invention to provide a camera having a data protection circuit for protecting against the loss of control data due to the influence of static electricity and electrical noise.

Another object of the present invention is to provide a camera where, even if static electricity from the body of a user enters the electrical circuitry of the camera, the settings of the control circuit are not disrupted and normal photography can be carried out.

In accordance with the present invention, a detector detects when the cover of the camera makes a transition between a closed state and an open state. A data register, which may be integrated with a CPU, stores control data. Temporary storing means temporarily stores the control data during times when the control data stored in the data register may be disrupted. Control means, including the CPU, receives the control data from the data storage register for controlling operation of the camera depending on the control data. The control means transfers the control data from the data register to the temporary storing means when the cover makes the transition from the closed state to the open state.

By such a construction, when the user opens the camera cover to install new film, the control data stored in the data register is written into the temporary storing means so that even if static electricity disrupts the contents of the data register, the set control data can be safely retrieved from the temporary storing means. The control data is transferred from the temporary storing means back to the data register when the cover makes the transition from the open state to the closed state. Thus, in accordance with the present invention, the disruptive effects of static electricity or electrical noise inputted through the DX terminals (or otherwise received by the electronic circuitry of the camera) is prevented since the settings stored as control data in the data register are transferred to the temporary storing means whenever the cover is opened.

DETAILED DESCRIPTION OF THE INVENTION

Figure 1:
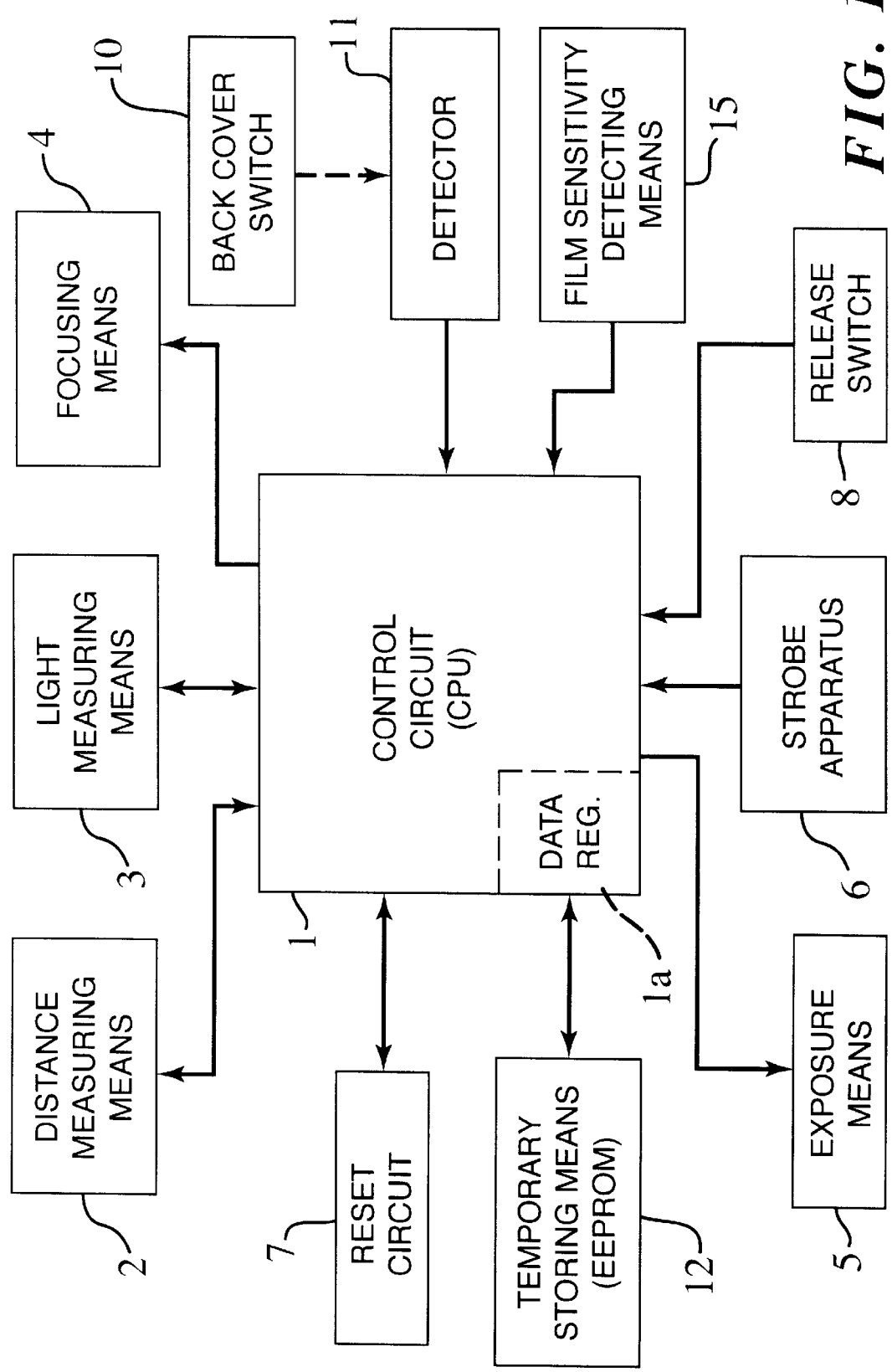
FIG. 1 is a block diagram of a camera according to one embodiment of the present invention.

One embodiment of the present invention will be described with reference to FIGS. 1 and 2 which show, respectively, a block diagram of a camera constructed according to the present invention and a rear perspective view of the camera illustrating a film changing operation. The camera has a detector 11 which detects when a back cover 9 of the camera makes a transition between a closed state and an open state and generates a detection signal denoting the change of state of the cover. A data register 1a of a CPU 1 stores control data that is used to control the operations of the camera. Temporary storing means 12, such as an EEPROM, temporarily stores the control data at times when the settings of the control data may be disrupted due to, for example, when high voltage resulting from an electrostatic discharge from the body of a user is applied to the DX terminals of the camera, or when the power level of the battery of the camera exceeds a predetermined range, or when the battery is removed. A control circuit comprising the CPU 1 controls the operation of the camera depending on the control data stored in the data register. The control circuit 1 and the data register 1a are preferably integrated in a microprocessor. The control circuit 1 receives the control data from the data register 1a and also the detection signal from the detector 11. The control circuit 1 transfers the control data from the data register 1a to the temporary storing means (EEPROM) 12 when the back cover 9 makes the transition from the closed state to the open state. The control data is then transferred from the temporary storing means 12 back to the data register 1a when the cover 9 makes the transition from the open state to the closed state.

When the user actuates a back cover switch 10 to open the back cover 9 of the camera, the DX terminals are susceptible to electrical noise, such as high voltage static electricity accumulated on the body of the user. This high voltage may be inputted to the control circuit 1 through the DX terminals 15 and disrupt the control data settings stored in the data register 1a. However, in accordance with the present invention, the control data is transferred from the data register 1a to the temporary storing means 12 when the cover 9 is being opened. Once the cover 9 is closed, the control data is transferred from the temporary storing means 12 back to the data register 1a, where it is used by the control circuit 1 to control the operation of the camera.

The camera is provided with sensitivity detecting means (DX terminals) 15 for detecting film sensitivity data 14 formed on the exterior of a film case 13 (FIG. 2) and producing a corresponding sensitivity signal representative of the film sensitivity read from the film case. The control circuit 1 receives the sensitivity signal and controls the operation of the camera dependent thereon. Thus, the control circuit 1 can adjust the exposure setting, etc. during operation of the camera based on the detected film sensitivity, or film speed, of the film installed in the camera. The DX terminals 15 are electrically connectable with the pattern of film sensitivity data 14 formed on the film case 13 for detecting the film sensitivity dependent on the pattern. A distance measuring means 2 is provided for measuring the distance of the camera to a subject to be photographed and providing corresponding distance information to the control circuit 1. Light measuring means 3 measures the brightness of the subject and applies brightness information to the control circuit 1, and focusing means 4 adjusts the position of the photographic lens of the camera under control of the control circuit 1. Light exposure means 5 effects exposure of the film under control of the control circuit 1, and a strobe apparatus 6 produces strobe light for strobe photography.

Figure 3:
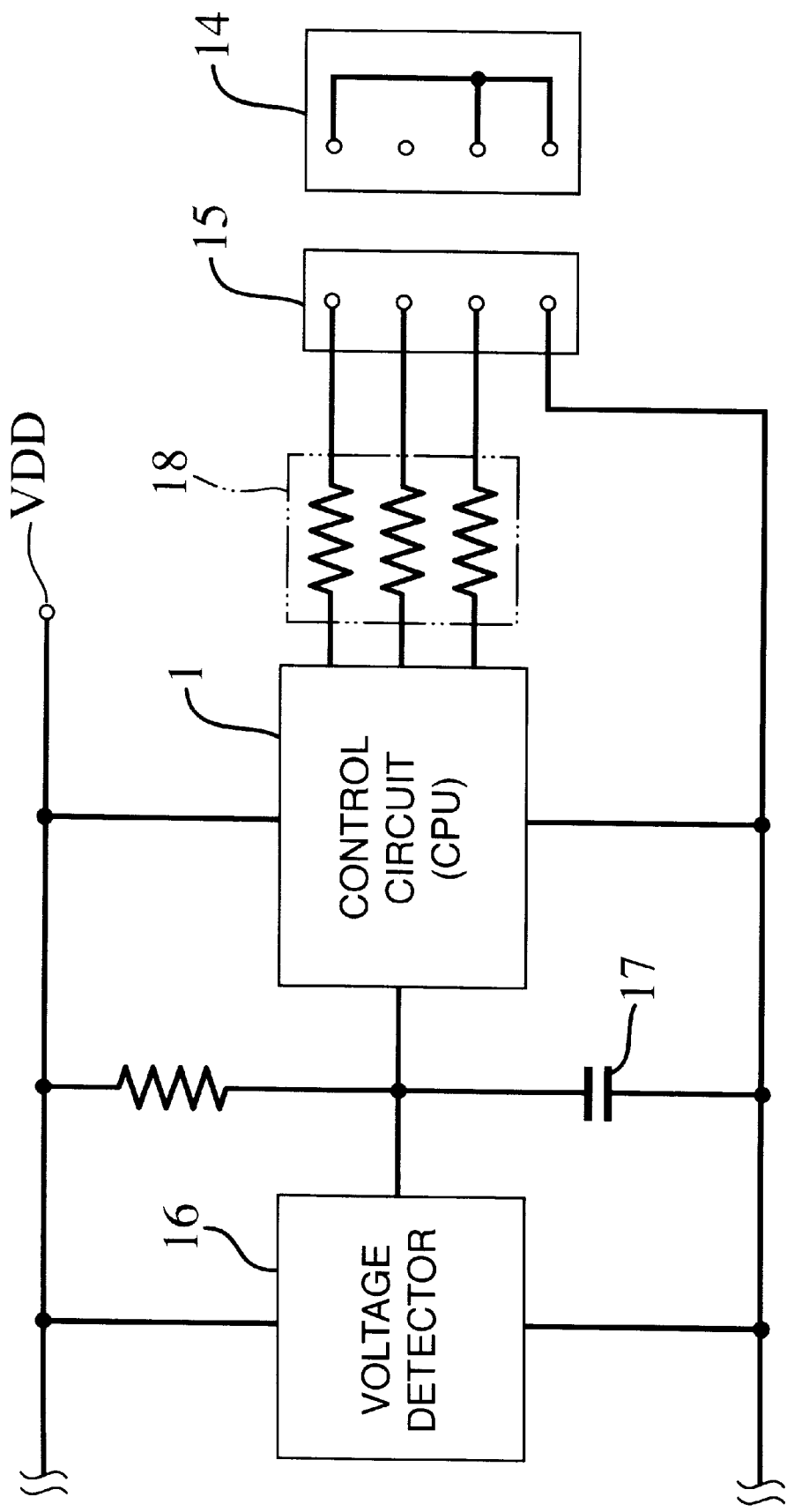
FIG. 3 is a circuit diagram of a portion of an electrical circuit in accordance with the present invention.

FIG. 3 is a circuit diagram of a portion of the circuit of the camera. A voltage detector 16 and a capacitor 17 constitute the reset circuit 7 and are connected to the CPU 1. If the power supply voltage VDD falls below a predetermined level, the output from the voltage detector 16 has a low level so that the capacitor 17 discharges. When the capacitor 17 discharges, the CPU 1 is reset. A set of resistors 18 is connected to the CPU to protect it from abnormally large applied voltages. The DX terminals 15 are connected through the resistors 18 to the CPU 1. The DX terminals 15 are electrically connectable with the film sensitivity pattern 14 formed on the surface of the film case 13 when the film case is installed in the camera.

Figure 4A:
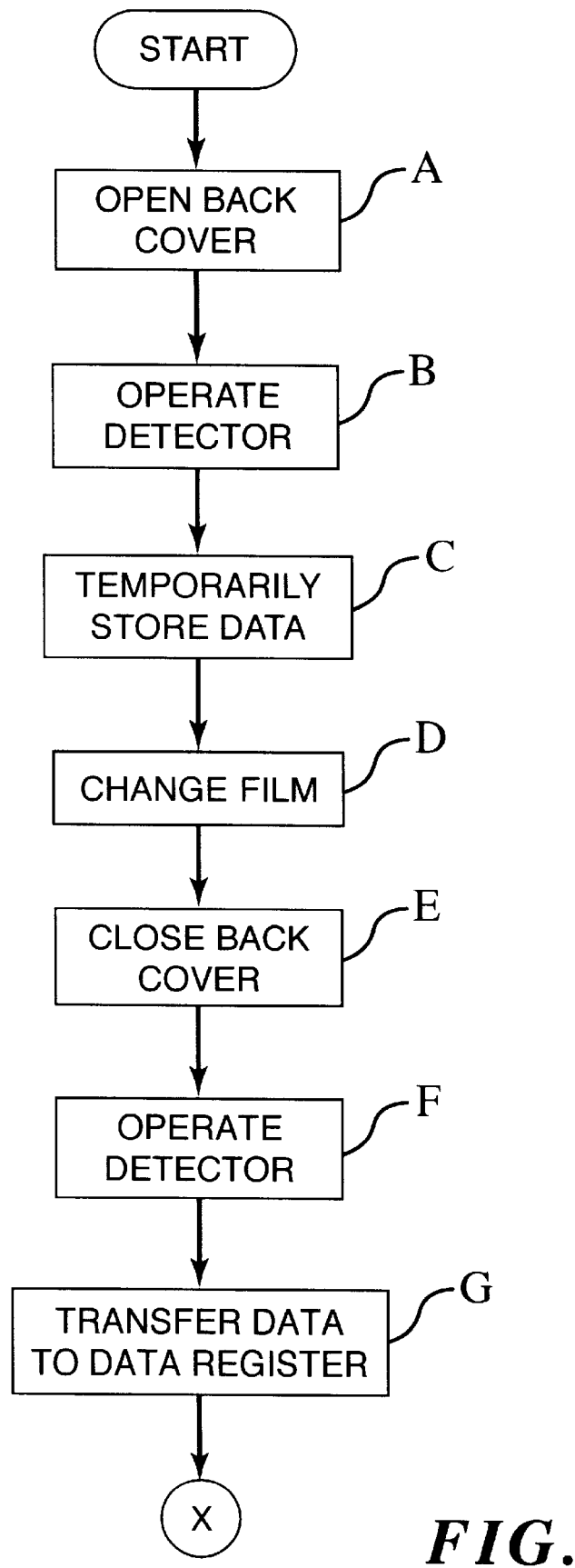
FIG. 4 is a flow chart showing film changing and photograph taking operations in accordance with the present invention.
Figure 4B:
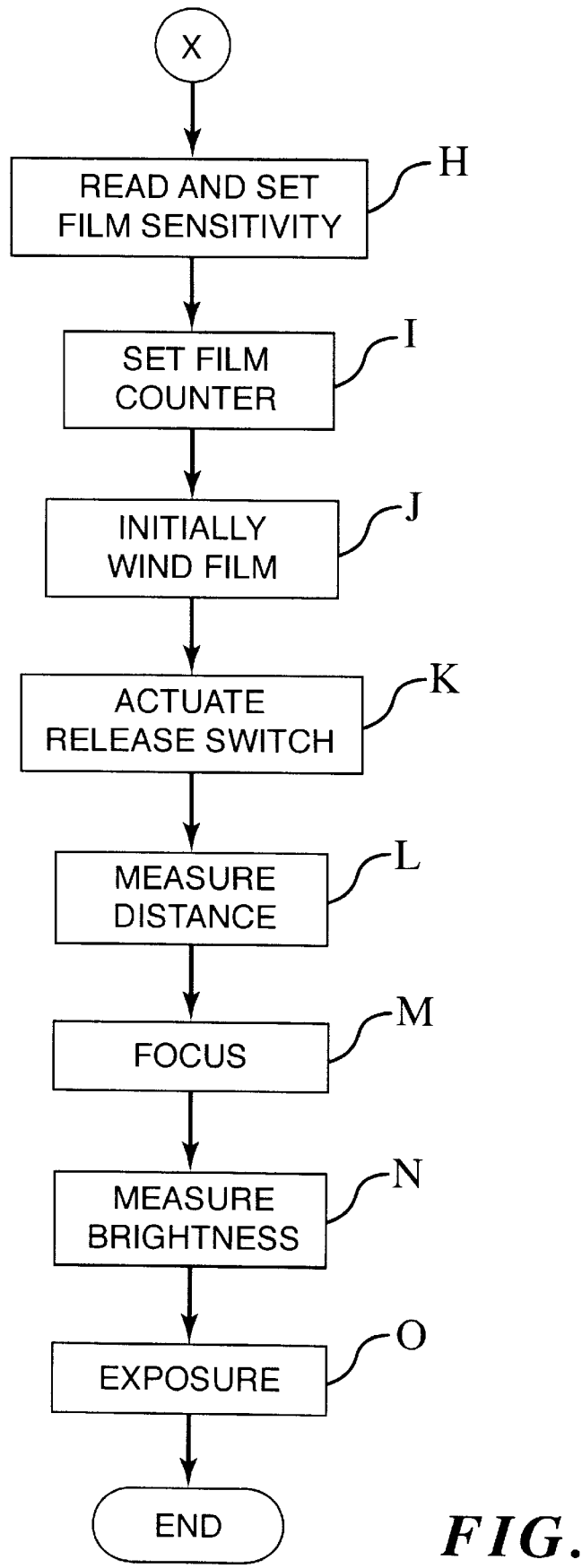

FIG. 4 is a flow chart showing the operation for taking photographs using the inventive camera after the film case 13 has been installed. When the user operates the back cover switch 10, the back cover 9 (shown in FIG. 2) opens (step A). The detector 11 detects that the back cover 9 has made a transition from the closed state to the open state (step B). Upon receiving the detection signal from the detector 11, the CPU 1 transfers the control data stored in the data register 1a for each of the various conditions for taking photographs (photographic mode, strobe mode, circuit terminal set-up conditions, etc.) to the temporary storing means 12 for temporary storage (step C). Once the above steps A–C have been instantaneously carried out, the opening operation for the back cover 9 is complete.

Figure 2:
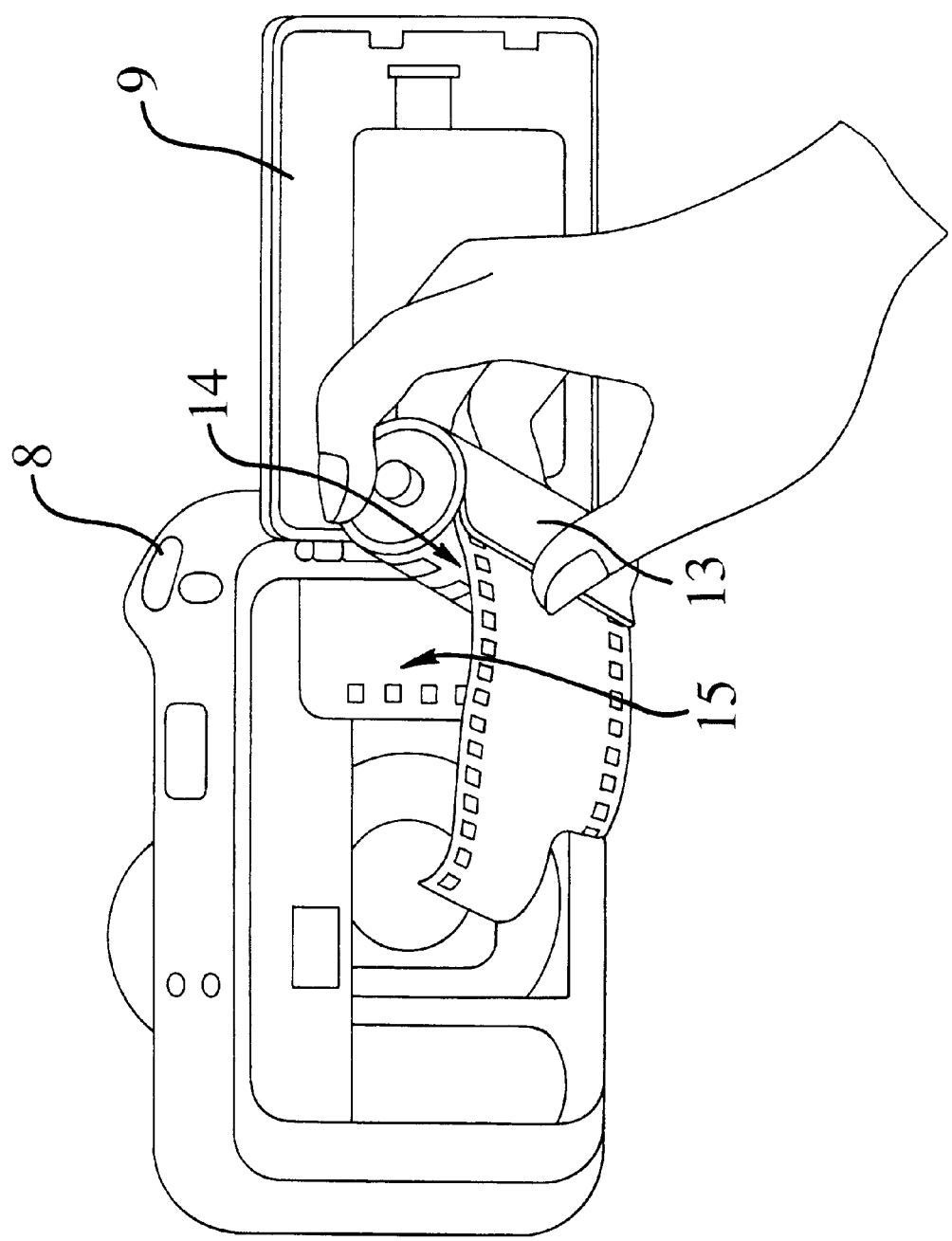
FIG. 2 is a rear perspective view of the camera illustrating a film changing operation in accordance with the present invention.

The user then changes the film as shown in FIG. 2 (step D). At this time, if static electricity accumulated on the body of the user is input as noise via the set of DX terminals 15, each of the various set-up conditions (control data) may be disrupted, or if the inputted static electricity enters the CPU 1 and is transmitted to the VDD terminal shown in FIG. 3, the voltage detector 16 can malfunction and the CPU 1 may be reset.

After a new film case 13 has been installed, the user closes the back cover 9 (step E). The detector 11 detects that the back cover 9 has made a transition between the open state and the closed state (step F). Upon receiving the detection signal from the detector 11, the CPU 1 transfers the control data from the temporary storing means 12 to the data register 1a (step G). Thus, even if the contents of the data register 1a (photographic conditions and circuit terminal conditions, etc.) are disrupted, or the CPU 1 is reset by the effects of static electricity when the film is changed in step D, each of these conditions (control data) is restored in step G. Upon installing the new film case 13, the pattern of film sensitivity data 14 makes contact with the DX terminals 15, and the film sensitivity of the installed film is determined and set (step H). Then, a film counter (not shown) is reset (step I), and the initial winding of the film is carried out (step J). Once the changing of the film is completed, the sequence goes to normal photographing operation.

To take photographs, the user actuates a release switch 8 on the camera (step K). A photographing operation is then carried out based on the control data stored in the data register 1a which were set in step G. The distance to the subject is measured (step L) by the distance measuring means 2, and focusing is carried out (step M) by the focusing means 4. Light measuring is carried out by the light measuring means 3 (step N), and the exposure conditions are set in accordance with the film sensitivity read from the film sensitivity pattern 14 by the light exposure means 5 (step O). Depending on the photographic conditions, the strobe apparatus 6 may be brought into operation.

The control data stored in the temporary storing means 12 is not limited to any particular data. Since the settings of the CPU 1 may be disrupted or erased by high voltage or a reset operation, various data corresponding to the settings for each camera can also be stored in the temporary storing means 12.

In accordance with the present invention, even if static electricity is inputted through the set of DX terminals 15 (or through other sources), the various conditions (control data) for operation of the camera are set into the data register 1a of the CPU 1 when the back cover 9 is closed. Therefore, the present invention protects the control data used for controlling the operation of the camera by temporarily storing the control data in a temporary storing means 12 during conditions when the control data may be disrupted.

We claim:

1. A camera having a cover that can be opened and closed, comprising: detecting means for detecting the opening and closing of the cover; film sensitivity detecting means for detecting film sensitivity; temporary storing means isolated from static electricity applied to the sensitivity detecting means for storing data; and control means connected to the film sensitivity detecting means and having a data register for controlling the camera operation depending on data stored in the data register, the control means including means for transferring the data from the data register to the temporary storage means when the detecting means detects that the cover has made a transition from a closed state to an open state, and for transferring the data from the temporary storage means back to the data register in preparation for the taking of photographs when the detecting means detects that the cover has made a transition from the open state to the closed state so as to protect data from disruption due to static electricity.

2. A camera, comprising: a cover movable between a closed state and an open state; detecting means for detecting when the cover makes a transition between the closed state and the open state and producing a corresponding detection signal; a data register for storing control data; film sensitivity detecting means for detecting film sensitivity; temporary storing means for temporarily storing the control data; and control means for controlling operation of the camera depending on the control data stored in the data register, the control means including means responsive to the detection signal for transferring the control data from the data register to the temporary storing means when the cover makes a transition from the closed state to the open state and for transferring the control data from the temporary storing means back to the data register when the cover makes the transition from the open state to the closed state so as to protect data from disruption due to static electricity.

3. A camera according to claim 2; wherein the temporary storing means comprises an EEPROM.

4. A camera according to claim 3; wherein the control means and the data register are integrated in a microprocessor.

5. A camera according to claim 4; wherein the film sensitivity detecting means includes means for detecting a film sensitivity from a film case and producing a corresponding sensitivity signal; and wherein the control means includes means receptive of the sensitivity signal for controlling operation of the camera based on the sensitivity signal.

6. A camera according to claim 5; wherein the sensitivity detecting means further includes DX terminals connectable with a film sensitivity pattern on the film case for detecting the film sensitivity dependent on the pattern.

7. A camera according to claim 5; further comprising a power supply for supplying power to the control means; and resetting means for resetting the control means when the power from the power supply falls below a predetermined level.

8. A camera according to claim 7; wherein the resetting means comprises a voltage detector and a capacitor.

9. A camera according to claim 7; wherein the control means includes means for transferring the control data stored in the temporary storing means back to the data register after the control means has been reset.

10. A camera according to claim 2; wherein the control means and the data register are integrated in a microprocessor.

11. A camera according to claim 10; wherein the film sensitivity detecting means includes means for detecting a film sensitivity from a film case and producing a corresponding sensitivity signal; and wherein the control means includes means receptive of the sensitivity signal for controlling operation of the camera based on the sensitivity signal.

12. A camera according to claim 11; further comprising a power supply for supplying power to the control means; and resetting means for resetting the control means when the power from the power supply falls below a predetermined level.

13. A camera according to claim 12; wherein the control means includes means for transferring the control data stored in the temporary storing means back to the data register after the control means has been reset.

14. A camera according to claim 10; further comprising a power supply for supplying power to the control means; and resetting means for resetting the control means when the power from the power supply falls below a predetermined level.

15. A camera according to claim 14; wherein the control means includes means for transferring the control data stored in the temporary storing means back to the data register after the control means has been reset.

16. A camera according to claim 2; wherein the film sensitivity detecting means includes means for detecting a film sensitivity from a film case and producing a corresponding sensitivity signal; and wherein the control means includes means receptive of the sensitivity signal for controlling the operation of the camera based on the sensitivity signal.

17. A camera according to claim 2; further comprising a power supply for supplying power to the control means; and resetting means for resetting the control means when the power from the power supply falls below a predetermined level; and wherein the control means includes means for transferring the control data stored in the temporary storing means back to the data register after the control means has been reset.

18. A camera according to claim 2; further comprising resetting means for resetting the control means; and wherein the control means includes means for transferring the control data stored in the temporary storing means back to the data register after the control means has been reset.

* * * * *